3,692,470
CRYSTALLINE ZEOLITE ZSM-10
Julius Ciric, Glassboro, N.J., assignor to
Mobil Oil Corporation
No Drawing. Filed Oct. 9, 1969, Ser. No. 865,193
Int. Cl. C01b 33/28
U.S. Cl. 423—328                                      6 Claims

ABSTRACT OF THE DISCLOSURE

A family of zeolites, known as ZSM-10, having the X-ray diffraction interplanar spacings of Table 1 of the specification; the preparation of same from a reaction mixture containing silica, alumina, potassium oxide, an oxide of 1,4-dimethyl-1,4-diazoniabicyclo(2,2,2)octane, and water; and organic compound conversion with a catalytically-active form of said zeolite.

BACKGROUND OF THE INVENTION

Field of the invention

This invention relates to a new synthetic crystalline zeolite composition, to a method of preparing the same and to organic compound conversion therewith. More particularly, this invention relates to the synthesis of a novel crystalline alumino-silicate known as ZSM-10 from a mixture of water, alumina, silica, potassium oxide and an oxide of 1,4-dimethyl-1,4-diazoniabicyclo[2,2,2]octane.

Discussion of the prior art

Crystalline aluminosilicate zeolites, structurally consist basically of an open three-dimensional framework of $SiO_4$ and $AlO_4$ tetarahedra. Such tetrahedra are cross linked by the sharing of oxygen atoms, so that the ratio of oxygen atoms to the total of the aluminum and silicon atoms is equal to two. The negative electrovalence of tetrahedra containing aluminum is balanced by the inclusion within the crystal of cations, such as alkali or alkaline earth metal ions.

Many zeolites possess a crystal structure having channels of molecular dimensions. The interstitial spaces are generally originally occupied by water of hydration. After at least partial dehydration, these zeolites may be utilized as efficient adsorbents whereby adsorbate molecules are retained within the interstitial spaces. The interstitial dimensions of openings in the crystal lattice limit the size and shape of the molecules that can be adsorbed. A separation of a mixture of various molecules, based upon molecular dimensions, wherein certain molecules are adsorbed by the zeolite while others are excluded from admission is therefore possible. It is such characteristic of many crystalline zeolites that has led to their designation as "molecular sieves."

A number of synthetic crystalline zeolites have previously been prepared. They are distinguishable from each other and from naturally-occurring zeolites on the basis of composition, crystal structure and adsorption properties. The existence of a number of zeolites having similar but distinguishable properties advantageously permits the selection of a particular member having optimum properties for a particular use.

SUMMARY OF THE INVENTION

Broadly, this invention contemplates a novel crystalline zeolite composition having the X-ray diffraction pattern of Table 1 of the specification.

In a particularly desirable embodiment, this invention contemplates a novel crystalline aluminosilicate zeolite having the X-ray diffraction pattern of Table 1 of the specification and having a composition, expressed in terms of mol ratios of oxides, as follows:

$$M_{2/n}O:Al_2O_3\text{:}5 \text{ to } 7\ SiO_2\text{:}3 \text{ to } 9\ H_2O$$

wherein M is a cation and $n$ is the valence of M. In the as synthesized form of the new zeolite composition of the present invention, the composition can be represented, in terms of mol ratios of oxides, as follows:

$$x\text{TO:}(1-x)K_2O:Al_2O_3\text{:}5 \text{ to } 7\ SiO_2\text{:}3 \text{ to } 9\ H_2O$$

wherein T is 1,4-dimethyl-1,4-diazonia(2,2,2)bicyclooctane and $x$ is between .2 and .4.

In a particularly desirable embodiment of this invention, the cation, above referred to by a numeral, is one in which the ion is hydrogen or hydrogen ion precursor such as ammonium or a metal from Group II to Group VIII of the Periodic Table.

Preferably, the metal is one in which in that form the zeolite has catalytic activity for organic compound conversion especially for hydrocarbon conversion. It is particularly desirable that the catalyst composition be one which is useful for one of the reactions employed in petroleum refining. Such reactions include cracking, hydrocracking, isomerization, disproportionation, polymerization, dehydration, alkylation, dealkylation, and reforming.

The nitrogen-containing cation in the as synthesized form of ZSM-10 is introduced upon crystallization in a reaction mixture containing 1,4-dimethyl-1,4-diazoniabicyclo[2,2,2]octane. Upon thermal activation of the product, i.e., by heating in an inert atmosphere at a temperature in the range of 200 to 600° C. the nitrogen-containing cation undergoes degradation to the hydrogen ion.

In a particularly desirable embodiment of the present invention, ZSM-10 is prepared from reaction mixtures containing a 1,4-dimethyl-1,-diazoniabicyclo[2,2,2]octane ion and more specifically, by heating in an aqueous solution a mixture of the oxides of materials whose chemical compositions can be completely represented as mixtures of the oxides of $K_2O$, $Al_2O_3$, $$[(CH_3)_2(CH_2CH_2)_3N_2]O$$

$SiO_2$ and $H_2O$ suitably at a temperature of about 100° C. for periods of time ranging from 2 to 250 hours or longer. The composition of the reaction mixture, expressed in terms of mol ratios of oxides, preferably falls within the following ranges:

|  | Broad | Preferred |
| --- | --- | --- |
| $SiO_2/Al_2O_3$ | 10 to 25 | 13 to 17. |
| $H_2O/K_2O+TO$ | 60 to 150 | 60 to 100. |
| $K_2O/SiO_2$ | .22 to .43 | .27 to .35. |
| $TO/SiO_2$ | .02 to .28 | .10 to .15. |

NOTE.—T=1,4-dimethyl-1,4-diazoniabicyclo(2,2,2)octane.

The product which crystallizes from the reaction mixture is separated, suitably by centrifuging or filtration, washed with water until the effluent washed water in equilibrium with the zeolite has a pH from about 8 to about 12. The material, so obtained, is thereafter activated by heating in an inert atmosphere and preferably air or in oxygen-containing gas at a temperature in the approximate range of 200 to 600° C. In making a zeolite ZSM-10, the usual method comprises reacting, in aqueous media, potassium aluminate or other source of potassium oxide and alumina with an oxide of 1,4-dimethyl-1,4-diazoniabicyclo[2,2,2]octane such as the silicate thereof. The reaction is carried out in a suitable vessel made, for example, of metal or brass capable of closure to prevent loss of water. The reaction mixture is initially continuously or periodically stirred to insure homogeneity. After this mixting, agitation can be stopped as it is unnecessary to agitate the reaction mass during the formation and crystallization of the zeolite, although mixing during such later stages has not been found to be detrimental.

The crystallization procedures can be satisfactorily carried out at temperatures within the range of from about 90° C. to about 120° C., the pressure being atmospheric or at least that corresponding to the vapor pressure of water in equilibrium with the mixture of reactants. While temperatures as low as about 20° C. may be employed, such lower temperatures require a long reaction period. Preferably, a temperature of about 95° C. to 100° C. is employed. Heating is continued until the desired crystalline zeolite product is formed. The zeolite crystals are then separated from the mother liquor and washed, preferably with distilled water, until the effluent wash water in equilibrium with the product has a pH of between about 8 and about 12.

For satisfactory use as an adsorbent, zeolite ZSM-10 should be activated by at least partial dehydration. Such activation can be effected, for example, by heating the zeolite to temperatures within the approximate range of 200 to 600° C. in an inert atmosphere, and preferably air under atmospheric or reduced pressure, or by maintaining the zeolite at room temperature under vacuum.

In the synthesis of zeolite ZSM-10, it has been found that the composition of the reaction mixture is critical. Specifically, the presence in such mixture of N,N'-di-methyltriethylene-diammonium ions in ratios specified has been found to be essential for the production of zeolite ZSM-10. In the absence of such ions, no zeolite ZSM-10 is obtained. The crystallization temperature and the length of time the crystallization temperature is maintained are important variables in determining the yield of crystalline material. Under some conditions, for example, too low a temperature for too short a time, no crystalline product is realized. Extreme conditions may also result in formation of materials other than zeolite ZSM-10.

Similarly, in the synthesis of ZSM-10, it has been found critical to employ in the reaction mixture potassium oxide. If another oxide such as a sodium oxide is employed, ZSM-10 is not synthesized and another material is obtained. The potassium oxide can be supplied in that form as potassium silicate, as potassium aluminate or in the form of potassium hydroxide.

The 1,4-dimethyl-1,4-diazoniabicyclo[2,2,2]octane silicate (N,N'-dimethyltriethylenediammonium silicate) solution employed is suitably prepared by dissolving silica gel in a solution of 1,4-dimethyl-1,4-diazoniabicyclo[2,2,2] octane dihydroxide. In place of silica gel, other sources of silica may be employed, for example, hydrosols of silica, silicate esters, silica aerogels and freshly prepared, low molecular weight silicic acids. The above dihydroxide may be prepared by complete methylation of 1,4-diazabicyclo-[2,2,2]octane, also known as triethylenediamine, with methyl iodide to yield 1,4-dimethyl-1,4-diazoniabicyclo-[2,2,2] octane diiodide which upon subsequent reaction with silver hydroxide is converted to the dihydroxide.

ZSM-10 as prepared by the method of the present invention has a uniform effective pore diameter of about 7–8 Angstroms. In the as crystallized form of the zeolite, it is capable of sorbing about 6 percent by weight cyclohexane and 12 percent by weight normal hexane. After it is exchanged to the ammonium form and calcined at 1000° F. for two hours to yield a stable hydrogen form, the sorption properties reveal that it sorbs about 11 percent by weight normal hexane at room temperature.

ZSM-10 has a distinctive X-ray diffraction pattern indicating it to be a new composition or matter. Members of the family of ZSM-10 zeolites possess definite distinguishing crystalline structure whose X-ray diffraction pattern has the following values:

TABLE 1

| Interplanar spacing $d$ (A.): | Relative intensity |
|---|---|
| 15.85 | 58 |
| 13.92 | 42 |
| 10.22 | 13 |
| 7.87 | 22 |
| 7.55 | 56 |
| 7.04 | 13 |
| 6.29 | 35 |
| 5.96 | 22 |
| 5.46 | 31 |
| 5.25 | 15 |
| 5.06 | 25 |
| 4.50 | 76 |
| 4.41 | 67 |
| 4.32 | 27 |
| 3.87 | 91 |
| 3.64 | 100 |
| 3.54 | 56 |
| 3.47 | 25 |
| 3.42 | 27 |
| 3.32 | 13 |
| 3.22 | 16 |
| 3.16 | 31 |
| 3.10 | 67 |
| 3.04 | 73 |
| 2.89 | 89 |
| 2.73 | 48 |
| 2.69 | 15 |
| 2.57 | 15 |

These values were determined by standard techniques. The radiation was the K alpha doublet of copper and a Geiger counter spectrometer with a strip chart pen recorder was used. The peak heights (I) and the positions as a function of two times theta, where theta is the Bragg angle, were read from the spectrometer chart. From these, the relative intensities, 100 $I/I_o$ is the intensity of the strongest line or peak, and $d$ (obs.), the interplanar spacing in angstroms, corresponding to the recorded lines, were calculated.

It should be understood that this X-ray diffraction pattern is characteristic of all species of the ZSM-10 compositions. Ion exchange of the potassium ion with another cation substantially the same pattern with minor shifts in interplanar spacing and variation in relative intensity. Various cation exchanged forms of ZSM-10 compositions have been prepared. X-ray powder diffraction patterns of these do not vary substantially indicating the same spatial arrangement of the aluminum silicon and oxygen atoms in the framework.

ZSM-10 can be used either in the alkali metal form, e.g., the potassium form, the ammonium form, the hydrogen form, or another univalent or multivalent cationic form. Preferably, one or other of the last two forms is employed. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or physically intimately admixed therewith. Such component can be impregnated in or on to ZSM-10, the new zeolite such as, for example, by, in the case of platinum, treating the zeolite with a platinum metal-containing ion. Thus, suitable platinum compounds include chloroplatinic acid, platinous chloride and various compounds containing the platinum ammine complex.

Members of the ZSM-10 family, can be base exchanged to remove the potassium cations by such ions as hydrogen (from acids), ammonium, and alkylammonium and arylammonium including $RNH_3$, $R_3NH^+$, $R_2NH_2^+$ and $R_4N^+$ where R is alkyl or aryl, provided that steric hindrance does not prevent the cations from entering the cage, and cavity structure of the ZSM-10 aluminosilicate composition. The hydrogen form of ZSM–10, useful in such hydrocarbon conversion processes as isomerization of poly-substituted alkyl aromatics is prepared, for example, by base exchanging the potassium form with, say, ammonium chloride or hydroxide whereby the ammonium ion is substituted for the potassium ion. The composition is then calcined at a temperature of, say 1000° F. causing evoluation of ammonia and retention of a proton in the composition. Other replacing cations include cations of the metals of the Periodic Table, especially metals other than sodium, especially metals of Group II, e.g. zinc and Group VIII of the Periodic Table and rare earth metals and manganese.

The above crystalline zeolite especially in its metal, hydrogen, ammonium, alkylammonium and arylammonium forms can be beneficially converted to another form by thermal treatment. This thermal treatment is generally performed by heating one of these forms at a temperature of at least 700° F. for at least 1 minute and generally not greater than 20 hours. While subatmospheric pressure can be employed for the thermal treatment, atmospheric pressure is desired for reasons of convenience. It is preferred to perform the thermal treatment in the presence of moisture although moisture is not absolutely necessary. The thermal treatment can be performed at a temperature up to about 1600° F. at which temperature some decomposition begins to occur. The thermally treated product is particularly useful in the catalyst of certain hydrocarbon conversion reactions.

Ion exchange of the zeolite can be accomplished conventionally, as by packing the zeolite in the form of beds in a series of vertical columns and successively passing through the beds a water solution of a soluble salt of the cation to be introduced into the zeolite; and then to change the flow from the first bed to a succeeding one as the zeolite in the first bed becomes ion exchanged to the desired extent. Aqueous solutions of mixtures of materials to replace the sodium can be employed. For instance, if desired, one can exchange the potassium with a solution containing a number of rare earth metals suitably in the chloride forms. Thus, a rare earth chloride solution commercially available can be used to replace substantially all of the potassium in as synthesized ZSM–10. This commercially available rare earth chloride solutio contains chlorides of rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, and other rare earth oxides 0.8 percent by weight. Didymium chloride is also a mixture of rare earth chlorides, but having a lower cerium content. It consists of the following rare earths determined as oxides: lanthanum 45–65 percent by weight, cerium 1–2 percent by weight, praseodymium 9–10 percent by weight, neodymium 32–33 percent by weight, samarium 5–7 percent by weight, gadolinium 3–4 percent by weight, yttrium 0.4 percent by weight, and other rare earths 1–2 percent by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations.

A wide variety of acidic compounds can be employed to prepare the hydrogen form of the ZSM–10 catalyst. These acidic compounds, which are a source of hydrogen ions, include both inorganic and organic acids.

While water will ordinarily be the solvent in the base exchange solutions employed, it is contemplated that other solvents, although generally less preferred, can be used in which case it will be realized that the above list of exchange compounds can be expanded. Thus, in addition to an aqueous solution, alcohol solutions and the like of the exchange compounds can be employed in producing the exchanged catalyst of the present invention. Generally, the alkali metal content is reduced to less than 4 percent by weight and preferably less than 1 weight percent. When the exchanged zeolite is prepared, it is generally, thereafter, treated with a suitable solvent, e.g. water, to wash out any of the anions which may have become temporarily entrained or caught in the pores or cavities of the crystalline composition.

As indicated above, the aluminoslicates prepared by the instant invention are formed in a wide variety of particular sizes. Generally speaking, the particles can be in the form of a powder, a granule, or a molded product, such as extrude having particle size sufficient to pass through a 2 mesh (Tyler) screen and be retained on a 400 mesh (Tyler) screen. In cases where the catalyst is molded, such as by extrusion, the aluminoslicate can be extruded before drying or dried or partially dried and then extruded.

In the case of many catalysts, it is desired to incorporate the ZSM–10 with another material resistant to the temperatures and other condtions employed in organic conversion processes. Such materials include active and inactive materials and synthetic or naturally-occurring zeolites as well as inorganic materials such as clays, silica and/or metal oxides. The latter may be either naturally occurring or in the form of gelatinous precipitates or gels including mixtures of silica and metal oxides. Use of a material in conjunction with ZSM–10, i.e., combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, zeolite materials have been incorporated into naturally-occurring clays, e.g., bentonite and kaolin, to improve the crush strength of the catalyst under commercial operating conditions. These materials, i.e., clays, oxides, etc., function as binders for the catalyst. It is desirable to provide a catalyst having good crush strength, because in a petroleum refinery the catalyst is often subjected to rough handling, which tends to break the catalyst down into powder-like materials which cause problems in processing. These clay binders have been employed normally only for the purpose of improving the crush strength of the catalyst.

Naturally-occurring clays which can be composited with the ZSM–10 catalyst include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the ZSM–10 catalyst also include inorganic oxides, notably alumina.

In addition to the foregoing materials, the ZSM–10 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicae ZSM–10 and inorganic oxide gel matrix vary widely with the crystalline aluminosilicate content ranging from about 1 to about 90 percent by weight and more usually, particularly when the composite is prepared in the form of beads in the range of about 2 to about 50 percent by weight of the composite.

Employing the ZSM–10 catalyst of this invention, containing a hydrogenation component, heavy petroleum residual stocks, cycle stocks, and other hydrocrackable charge stocks can be hydrocracked at temperatures between 400° F. and 825° F. using molar ratios of hydrogen to hydrocarbon charge in the range between 2 and 80. The pressure employed will vary between 10 and 2500 p.s.i.g. and the liquid hourly space velocity between 0.1 and 10.

Employing the catalyst of this invention for catalytic cracking, hydrocarbon cracking stocks can be cracked at a liquid hourly space velocity between 0.5 and 50, a temperature between 550° F. and 1100° F. and a pressure between about subatmospheric and several hundred atmospheres.

Employing a catalytically active form of a member of the ZSM-10 family of zeolites of this invention containing a hydrogenation component, reforming stocks can be reformed employing a temperature between 700° F. and 1000° F. The pressure can be between 100 and 1000 p.s.i.g. bus is preferably between 200 and 700 p.s.i.g. The liquid hourly space velocity is generally between 0.1 and 10, preferably between 0.5 and 4 and the hydrogen to hydrocarbon mole ratio is generally between 1 and 20 preferably between 4 and 12.

The catalyst can also be used for hydroisomerization of normal paraffins when provided with a hydrogenation component, e.g. platinum. Hydroisomerization is carried out at a temperature between 200 and 700° F., preferably 300 to 550° F., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin isomerization employing temperatures between 30° F. and 500° F.

Other reactions which can be accomplished employing the catalyst of this invention containing a metal, e.g. platinum, include hydrogenation-dehydrogenation reactions and desulfurization reactions.

In order to more fully illustrate the nature of the invention and the manner of practicing the same, the following examples are presented.

EXAMPLE 1

100 g. $N_1N_1$-dimethylpiperazine was mixed with 165 g. 1,2-dibromoethane and 242 g. ethylene glycol. The mixture was placed in a 1 liter flask equipped with reflux condenser and sampling port. Upon heating for 15 minutes on a 100° C. steam bath, a vigorous exothermic reaction took place. The mixture was heated for 2 hours and left overnight to crystallize to 1,4-dimethyl-1,4-diazonia-bicyclo(2,2,2)octane dibromide. The crystals were slurried with additional 200 cc. absolute ethanol, filtered and washed with another 100 cc. absolute ethanol. The raw yield was 176.3 g. (66%). Purity by Mohr bromide titration=76%. A small sample, was recrystallized from 95% ethanol and found to be ~100% pure by Mohr titration. The original material was found to contain only 1,4,-dimethyl-1,4-diazonia-bicyclo(2,2,2)octane dibromide.

The bromide was converted to hydroxide by passing through an ion exchange column containing an ion exchange resin known as Dowex 1-XB, a product of Dow Chemical Company, previously converted to OH⁻ form using KOH solution. Column dimensions 5.7 cm. dia., 46 cm. high. About 760 ml. solution, .71 normal by acid base titration, was recovered using 164 g. of the above raw 1,4-dimethyl-1,4-diazonia-bicyclo(2,2,2) octane dibromide material. Recovery was about 70%.

5.4 g. aluminum filings was dissolved in 19.3 g. KOH (87%) and 144 ml. water. Simultaneously a silica suspension was prepared by slurying 90 g. Cab-O-Sil in 38.7 g. KOH (87.7) and 424 ml. $H_2O$. The silicate suspension became somewhat clearer after 3 hours at room temperature, indicating some dissolution of silica. The solutions of potassium aluminate and potassium silicate were mixed in Waring Blendor to give 0.1 mol. of following composition: 4.5 $K_2O$-$Al_2O_3$-15 $SiO_2$-260 $H_2O$. Seven portions, each 72 g. (.01 mol), were weighed out. Following amounts of .35 molar solution of 1,4-dimethyl-1,4-diazonia-bicyclo(2,2,2)octane dihydroxide were added to each portion: Run 1=4.8 ml., Run 2=7.2 ml., Run 3=9.6 ml., Run 4=12.0 ml. Run 5=18.0 ml., Run 6=24.0 ml. The resulting compositions are listed in Table 2. The mixtures were allowed to stand at room temperature for three days, then crystallized to submicron size ZSM-10 in about 10 days. The solids were separated and washed by centrifugation at 10,000–14,000 r.p.m., using a high speed centrifuge.

TABLE 2

Crystallization of gels=$xT$—4.5 $K_2O$—$Al_2O_3$—15 $SiO_2$—$y$ $H_2O$

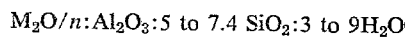

| Run | Starting gel composition | | X-ray analysis | Sorption | | | Final product analysis, mole ratios | | |
|---|---|---|---|---|---|---|---|---|---|
|  | x | y |  | $H_2O$ [1] | Cy. hex.[1] | n-Hex.[1] | T O [2]/ $Al_2O_3$ | $K_2O$/ $Al_2O_3$ | $SiO_2$/ $Al_2O_3$ |
| 1 | .20 | 341 | ZSM-10+(L) | 13.7 | 7.4 | 9.3 | .196 | .880 | 6.91 |
| 2 | .30 | 355 | ZSM-10 | 12.6 | 6.4 | 8.6 | .260 | .980 | 7.30 |
| 3 | .40 | 368 | ZSM-10 | 12.5 | 5.5 | 9.3 | .300 | .760 | 7.40 |
| 4 | .50 | 382 | ZSM-10 | 13.6 | 6.8 | 9.7 |  |  |  |
| 5 | .75 | 4.15 | ZSM-10 | 13.4 | 6.5 | 8.9 | .36 | .84 | 7.26 |
| 6 | 1.33 | 443 | ZSM-10 |  |  |  | .36 | .76 | 6.98 |

[1] Determined at 25° C. and 20 mm. Hg.
[2] Determined at 25° C. and 12 mm. Hg.

EXAMPLE 2

A sample of ZSM-10 material, thus prepared, was converted into the ammonium form by ion exchange employing a solution containing an ammonium salt. After the material was converted into the ammonium form, it was converted into the hydrogen form by subjecting the same to a temperature of 1000° F. for two hours. The resultant calcined material was a stable hydrogen form of ZSM-10 as evidenced by an unchanged X-ray diffraction pattern. The hydrogen form was found to sorb about 11 percent by weight normal hexane determined at room temperature and at a pressure of 20 mm. mercury.

The material was subjected to the test described in Superactive Crystalline Aluminosilicate Hydrocarbon Catalysts, P. B. Weisz et al., Journal of Catalysis, volume 4, August 1965. The alpha value was 110.

I claim:

1. A crystalline aluminosilicate zeolite having an open three-dimensional lattice framework of $SiO_4$ and $AlO_4$ tetrahedra cross-linked by the sharing of oxygen atoms, said zeolite having the X-ray diffraction values of Table 1 of the specification.

2. A novel crystalline zeolite according to claim 1 having a composition, expressed in terms of mol ratios of oxides, as follows:

$$M_2O/n : Al_2O_3 : 5 \text{ to } 7.4 \text{ } SiO_2 : 3 \text{ to } 9H_2O$$

wherein M is a cation and $n$ is the valence of M.

3. A novel crystalline aluminosilicate according to claim 2 having a composition, expressed in terms of mol ratios of oxides, as follows:

$$xTO : (1-x)K_2O : Al_2O_3 : 5 \text{ to } 7 \text{ } SiO_2 : 3 \text{ to } 9H_2O$$

wherein T is 1,4-dimethyl-1,4-diazonia(2,2,2)bicyclooctane and $x$ is between .2 and .4.

4. A crystalline aluminosilicate according to claim 2 wherein M comprises hydrogen, ammonium, and tetramethylammonium.

5. A method of preparing the crystalline zeolite of claim 1 which comprises forming a mixture of silica, alumina, water, potassium oxide, and an oxide of 1,4-dimethyl-1,4-diazonia(2,2,2)bicyclooctane wherein the composition of the reaction mixture, expressed in terms of mole ratios of oxides, falls within the following range:

| | |
|---|---|
| $SiO_2/Al_2O_3$ | 10–25 |
| $H_2O/K_2O+C_8H_{18}N_2O$ | 60–150 |
| $K_2O/SiO_2$ | .22–.43 |
| $TO/SiO_2$ | .02–.21 |

T=1,4-dimethyl-1,4-diazoniabicyclo(2,2,2)octane maintaining the reaction mixture at a temperature between 20° C. and 120° C. until crystals of said zeolite form.

6. A method according to claim 5 wherein the oxides fall within the following range:

| | |
|---|---|
| $SiO_2/Al_2O_3$ | 13–17 |
| $H_2O/K_2O+C_8H_{18}N_2O$ | 60–100 |
| $K_2O+C_8H_{18}N_2O/SiO_2$ | .27–.35 |
| $TO/SiO_2$ | .10–.15 |

References Cited

UNITED STATES PATENTS

| | | | |
|---|---|---|---|
| 3,101,337 | 8/1963 | Kerr | 23—112 X |
| 3,216,789 | 11/1965 | Breck et al. | 23—113 |
| 3,247,195 | 4/1966 | Kerr | 23—112 X |
| 3,298,780 | 1/1967 | Fleck | 23—113 |
| 3,306,922 | 2/1967 | Barrer et al. | 260—448 |

EDWARD J. MEROS, Primary Examiner

U.S. Cl. X.R.

252—455 Z; 260—448 C